United States Patent [19]

Carlson

[11] Patent Number: 4,684,001

[45] Date of Patent: Aug. 4, 1987

[54] CLUTCHING APPARATUS AND METHOD OF CLUTCHING

[76] Inventor: Erland F. Carlson, 6045 N. Broadway, Wichita, Kans. 67219

[21] Appl. No.: 747,770

[22] Filed: Jun. 24, 1985

Related U.S. Application Data

[63] Continuation-in-part of Ser. No. 472,095, Mar. 4, 1983, abandoned.

[51] Int. Cl.[4] .................... F16D 13/40; F16D 25/063
[52] U.S. Cl. ................................ 192/70; 192/85 AB; 192/112
[58] Field of Search ............... 192/85 AB, 70, 112, 192/85 A, 85 AA; 188/71.4, 264 A, 219.6

[56] References Cited

U.S. PATENT DOCUMENTS

| | | | |
|---|---|---|---|
| 672,610 | 4/1901 | Barnes | 192/6 R |
| 1,392,932 | 10/1921 | Giffin | 192/112 |
| 2,297,480 | 9/1942 | Kratzmann | 192/85 A |
| 2,375,854 | 5/1945 | Lambert | 192/85 AB |
| 2,462,825 | 2/1949 | Zimmerman et al. | 192/85 AA |
| 2,675,898 | 4/1954 | Morgan | 192/70 X |
| 2,881,880 | 4/1959 | Munschauer | 192/85 AA X |
| 3,468,402 | 9/1969 | Edwards | 192/18 A |
| 3,750,787 | 8/1973 | Link | 192/85 AB |
| 3,762,517 | 10/1973 | Hanks | 192/85 AB |
| 4,335,808 | 6/1982 | Johnson | 192/85 AB |
| 4,434,883 | 3/1984 | Raines | 192/110 R |
| 4,524,854 | 6/1985 | Miller | 192/84 C |

FOREIGN PATENT DOCUMENTS

| | | | |
|---|---|---|---|
| 704746 | 4/1941 | Fed. Rep. of Germany | 192/70 |
| 947130 | 8/1956 | Fed. Rep. of Germany | 192/85 AB |
| 925952 | 5/1963 | United Kingdom | 192/85 AB |

Primary Examiner—Rodney H. Bonck
Attorney, Agent, or Firm—John Wade Carpenter

[57] ABSTRACT

A pneumatic clutch/brake comprising an input shaft having a structure defining a pneumatic conduit. A pair of pistons having opposed faces is drivably connected with the input shaft and is axially movable along and with respect to the input shaft. A totally enclosed housing is rotatably carried and supported by the input shaft. A method of clutching/braking in a clutch/brake zone from a rotating power shaft while simultaneously preventing any matter including contaminants from entering or leaving the clutch/brake zone. The method comprises the steps of securing a shaft having a pneumatic passageway to the power shaft, and mounting a pair of opposed pistons on the shaft in the clutch/brake zone so that the pistons can be rotated by the shaft and axially movable thereon. The clutch/brake zone including the pair of opposed pistons are totally enclosed by rotatably supporting a totally enclosed housing on the shaft such that the totally enclosed housing restricts or limits the axial movement of the pistons while simultaneously preventing any matter including contaminants from entering or leaving the clutch/brake zone.

13 Claims, 9 Drawing Figures

CLUTCHING APPARATUS AND METHOD OF CLUTCHING

This is a continuation-in-part application of my co-pending application filed on Mar. 4, 1983 and having U.S. Ser. No. 472,095, now abandoned.

BACKGROUND OF THE INVENTION

1. Field of the Invention

This invention is related to a clutching apparatus and method of clutching. More specifically, this invention provides a pneumatic clutch, a pneumatic brake, and a method of clutching a power or input shaft to an output shaft.

The invention further relates to an improvement in friction clutches and brakes; and more particularly in the elimination of problems which arise when the clutches and brakes are required to operate in sterile environments or in environments laden with friction reducing material.

2. Description of the Prior Art

U.S. Pat. No. 3,498,431 by Sutaruk discloses a fluid pressure operating clutch which is responsive to the output of a compressor that the clutch drives. U.S. Pat. No. 2,106,472 by Aikman also discloses a fluid pressure operating clutch wherein fluid under pressure enters through the clutch hub and forces a pair of friction discs apart into engagement with a driving and driven member. U.S. Pat. No. 3,642,106 by Baer teaches a driven pulley wherein engagement of the clutch is effected mechanically. U.S. Pat. No. 2,807,344 by Jacobs and U.S. Pat. No. 2,907,425 by Pierce disclose a clutch which is mechanically actuated rather than being actuated by fluid under pressure. None of the foregoing prior art teaches or suggests the particular clutching apparatus and method of clutching of this invention.

SUMMARY OF THE INVENTION

This invention accomplishes its desired objects by providing a pneumatic clutch comprising a clutch input shaft having a structure defining a pneumatic conduit. A pair of pistons having opposed faces is drivably connected with the clutch input shaft and axially movable along and with respect to the clutch input shaft. A totally enclosed housing means is rotatably carried and supported by the clutch input shaft. The pair of pistons make a driving connection with the totally enclosed housing means when air is directed under pressure through the pneumatic conduit to the opposed faces for effectively moving the pair of pistons axially to seize the totally enclosed housing means, while the totally enclosed housing means prevents the transfer of any matter from within any internal cavity of the pneumatic clutch to the atmosphere simultaneously with preventing any matter, such as outside contaminants, from entering any internal cavity of the pneumatic clutch.

This invention also accomplishes its desired objects by providing a novel pneumatic brake comprising a brake input shaft having a structure defining a pneumatic conduit. A pair of pistons having opposed faces is drivably connected with the brake input shaft and is axially movable along and with respect to the brake input shaft. A totally enclosed housing means is totally carried and supported by the brake input shaft. A housing member means is attached to the totally enclosed housing means and is adapted to be keyed to a revolving first shaft in order to transmit rotary power from the revolving first shaft to the totally enclosed housing means such that the latter revolves about the brake input shaft. The pair of pistons makes a driving connection with the totally enclosed housing means when air is directed under pressure through the pneumatic conduit to the opposed faces for effectively moving the pair of pistons axially to seize the totally enclosed housing means, while the totally enclosed housing means in operation is revolving and prevents the transfer of any matter from within any cavity of the pneumatic brake to the atmosphere simultaneously with preventing any matter, such as outside contaminants, from entering any internal cavity of the pneumatic brake.

This invention further also accomplishes its desired objects by providing a method of clutching in a clutch zone from a rotating power shaft while simultaneously preventing any matter, such as contaminants, from entering or leaving the clutch zone. The method comprises the steps of securing a clutch shaft means having a pneumatic passageway to the power shaft. A pair of opposed piston means is mounted on the clutch shaft means in the clutch zone so that the pistons can be rotated by the clutch shaft means and are axially movable thereon. The clutch zone, including the pair of opposed pistons, is totally enclosed by rotatably supporting a totally enclosed housing means on the clutch shaft means such that the totally enclosed housing means restricts or limits the axial movement of the pistons while simultaneously prevents any matter, such as contaminants, from entering or leaving the clutch zone. The method finally comprises the step of introducing air under pressure through the pneumatic passageway to move the pistons axially while applying power to the power shaft to rotate the pistons until the pistons seize the totally enclosed housing means thereby transmitting rotary power from the rotating power shaft to the totally enclosed housing means while no matter, such as contaminants, enter or leave the clutch zone.

It is an object of this invention to provide a novel pneumatic clutch which is capable of easily being manufactured.

It is another object of this invention to provide a novel pneumatic brake which is also capable of easily being manufactured.

It is yet another object of the invention to provide a method of clutching in a clutch zone from a rotating power shaft while simultaneously preventing any matter from entering or leaving the clutch zone.

It is still yet another object of the invention to provide a friction coupling device in which the friction coupling members are totally enclosed to a degree such that containmants from the working environment cannot affect the torque transmitting capacity of the friction coupling device. Furthermore, spent lining residue cannot leave the friction interface cavity, and thus cannot contaminate a sterile working environment in which the friction coupling device may be operating.

It is a final object of the present invention to provide a construction which provides the aforementioned total enclosure and various mounting means, which when used in connection with certain accessories allow the invention to be easily mounted on machine components in a variety of ways to form a clutch or a brake.

These together with the various ancillary objects and features will become apparent as the following description proceeds, are attained by this invention, preferred embodiments being shown in the accompanying drawings, by way of example only, wherein:

DETAILED DESCRIPTION OF THE DRAWINGS

Figure 8:
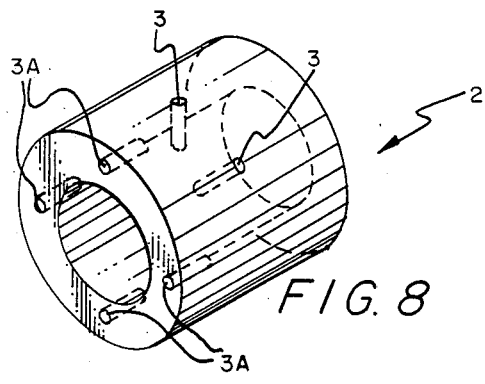
FIG. 8 is a perspective view of the bushing of this invention.

Referring in detail now to the drawings, wherein similar parts of the invention are identified by like reference numerals, there is seen a pneumatic clutch, generally illustrated as 6, having a clutch input shaft 10 that includes a pneumatic conduit 16 and input shaft splines 10A integrally formed therewith. Clutch input shaft 10 is mounted to an entirely cylindrical bushing, generally illustrated as 2 (see FIG. 8), by bolts, or the like 3B threadably passing through one of the threaded bushing apertures 3A. Bushing 2 also includes tap holes 3 wherethrough screws, bolts, or the like (not shown in the drawings) pass to connect and/or key the bushing 2 to a rotational shaft. In a preferred embodiment of the invention, bushing 2 may be keyed to a rotational shaft of an engine 9 (see FIG. 4) in order that rotational power can be imparted from the rotational shaft to the bushing 2 and the attached clutch input shaft 10.

The pneumatic clutch 6 of this invention also has a clutching means, generally illustrated as 8, which is defined by a pair of pistons 11—11 having opposed faces 12—12 and piston splines 11A—11A integrally formed therewith. Pistons 11—11 make a driving connection to the clutch input shaft 10 through the meshing of the piston splines 11A—11A with the input shaft splines 10A.

Figure 2:
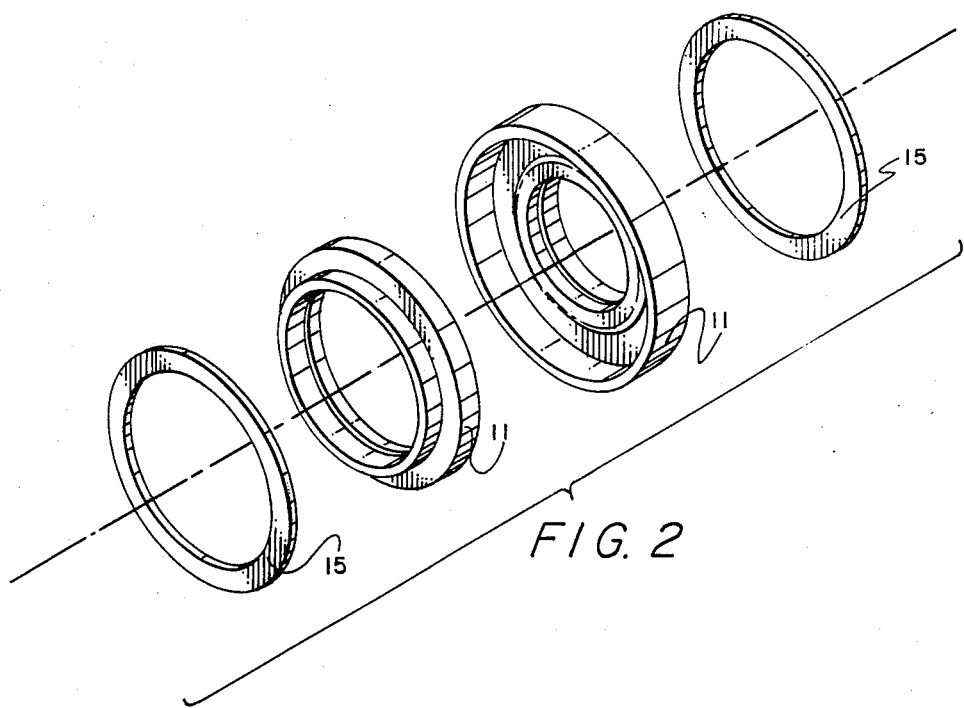
FIG. 2 is an exploded segmented perspective view illustrating the pistons and friction shoes which are mounted on the input shaft and are expanded by pneumatic air pressure to drive the shoes against the output shaft to effectively transmit power from the input shaft to the output shaft.

Pistons 11—11 are movable axially along the clutch input shaft 10. A totally enclosed housing, generally illustrated as 13, is rotatably carried and supported by the clutch input shaft 10. The totally enclosed housing 13 has two driving surfaces 14—14, and each piston 11—11 carries a friction shoe 15—15 (see FIG. 2) which is operable to mate with and seize the driving surfaces 14—14 of the totally enclosed housing 13 in order for the pistons 11—11 to make a driving connection with the totally enclosed housing 13.

Figure 3:
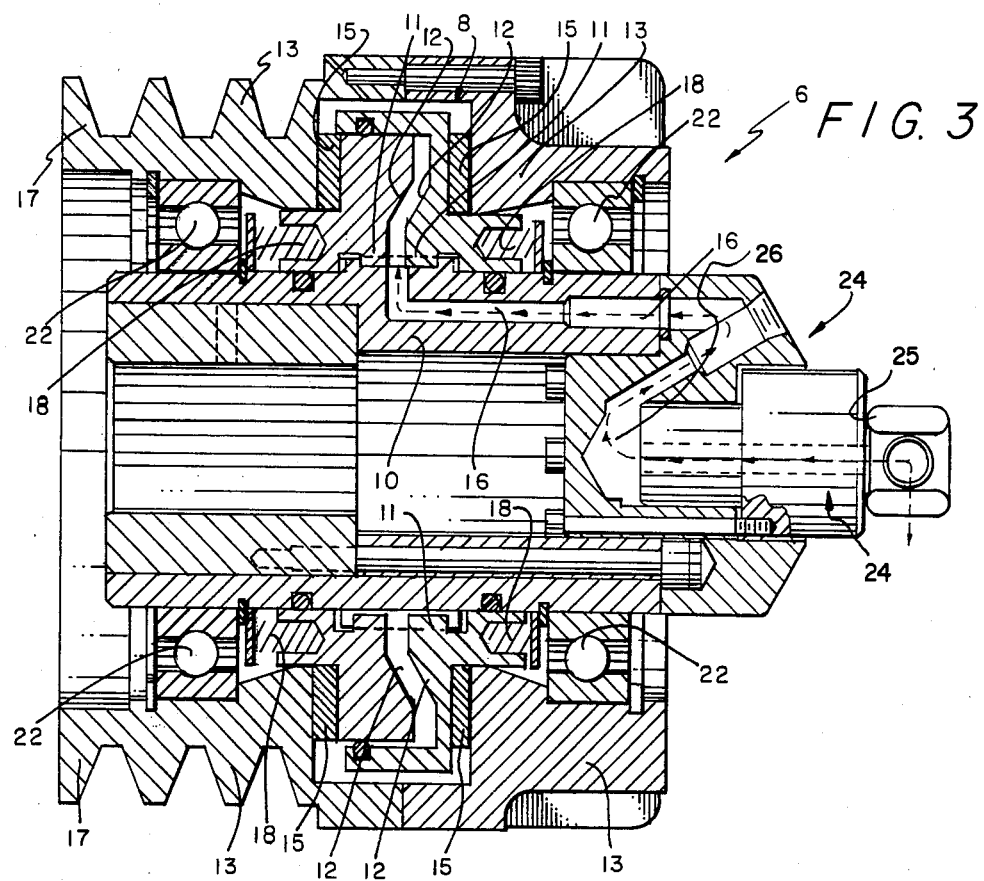
FIG. 3 is a vertical sectional view of the pneumatic clutch wherein the pair of pistons are expanded so that the friction shoes are engaged to the totally enclosed housing.

The pneumatic conduit 16 directs air under pressure to the opposed faces 12—12 of the pistons 11—11 to move axially the pistons 11—11 (see FIG. 3), including their respective friction shoes 15—15, in order for the shoes 15—15 to seize the driving surfaces 14—14 of the totally enclosed housing 13 to effect the driving connection. Spring bias members 18 are secured to the clutch input shaft 10 and to the pair of pistons 11—11 to oppose axial motion of the pistons 11—11 and to disengage the driving connection between the driving surfaces 14—14 and the friction shoes 15—15 after pressurized air is released from within the pneumatic conduit 16. Airtight seals 21 are situated between the clutch input shaft 10 and the pistons 11. A pair of sealed bearings 22—22 are positioned between the clutch input shaft 10 and the totally enclosed housing 13 in order for the totally enclosed housing 13 to be rotatably carried by the clutch input shaft 10 and properly aligned with the same. The pair of sealed bearings 22—22 are also axially positioned such that the spring biased members 18, the pistons 11—11 and their respective friction shoes 15—15, and the driving surfaces 14—14 of the totally enclosed housing 13, are all positioned between the pair of sealed bearings 22—22 in order to achieve the totally enclosed concept.

The totally enclosed housing 13 has a structure defining a pair of tapering surfaces 14A—14A (see FIGS. 5, 6 and 7) which taper from a larger diameter area, where the pair of sealed bearings 22—22 lodge, to a smaller diameter area where the pair of pistons 11—11 are engaged to the spring bias members 18. The open or flared area commencing from where the spring bias members 18 connect to the pair of pistons 11—11, and terminating where the pair of sealed bearings 22—22 rests between the clutch input shaft 10 and the totally enclosed housing 13, is for trapping grease, lubrication, or the like, emanating from one or both of the pair of sealed bearings 22—22 in the unlikely event that one or both of the sealed bearings 22—22 rupture from overheating or other causes. Centrifugal force would disperse the grease or lubrication from the a rotating sealed bearing 22 into the tapering, open area to prevent the grease or lubrication from getting on any of the friction surfaces, such as friction shoes 15—15 or the driving surfaces 14—14 of the totally enclosed housing 13.

Figure 9:
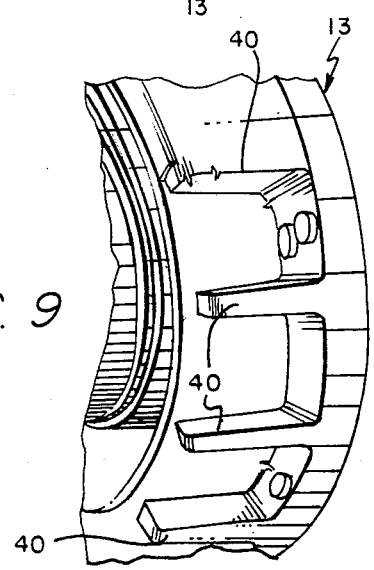
FIG. 9 is a partial perspective view of the totally enclosed housing having a plurality of fins.

In order to aid in insuring that the sealed bearings 22—22 and other internal parts do not overheat, the totally enclosed housing 13 preferably additionally includes a plurality of heat exchanging fins 40 (see FIG. 9) radially disposed on the outside thereof in order to assist in dissipating heat, from the body of the totally enclosed housing 13 into the surrounding atmosphere. Heat is generated from the moving members within the pneumatic clutch 6, and unless the heat is dissipated, the performance of the pneumatic clutch 6 of this invention may be lowered, or the clutch 6 may even burn out prematurely.

A pneumatic accessory assembly, generally illustrated as 24, is preferably mounted to the clutch input shaft 10. Pneumatic accessory assembly 24 has a Z-shaped pneumatic path 26 that is in communication with the pneumatic conduit 16 when the accessory assembly 24 is connected to the clutch input shaft 10. Accessory assembly 24 has an accessory body connection 25 that is swivelly attached to the body of the accessory assembly 24. Air under pressure enters the revolving accessory assembly 24 through the swivelly attached connection 25 and travels the Z-shaped pneumatic path 26 to enter the pneumatic conduit 16. The pneumatic accessory assembly 24 with its Z-shaped pneumatic path 26 enables the length of the pneumatic clutch 6 to be shortened.

An important feature of this invention is that housing 13 is totally enclosed in order to prevent outside contaminants from entering any of the clutch cavities. Outside contaminants, such as water, oil grease, or any residues, which may enter any of the clutch cavities could cause a loss of torque from slippage, accelerated wear of all friction facings, or even permanent damage to the pneumatic clutch 6. The totally enclosed housing 13 also prevents contaminants from leaving any of the clutch cavities to contaminate the atmosphere. This is important in those instances where a sterile environment is mandatory, as in pharmaceutical and food preparations.

Another important feature of this invention is that the clutch input shaft 10 is mounted on a bushing 2 that has an entirely cylindrical body. Bushing 2 does not have a tapering outer structure, but is a close fitting OD bushing with a uniform cylindrical body. This feature of this invention distinguishes this invention over prior art shaft alignment devices for a clutch or brake assembly, such as a dial indicator or the "QD bushing" (quick demount) that is taught by Raines in U.S. Pat. No. 4,434,883. The cylindrical bushing 2 of this invention assures that all friction engaging surfaces are parallely disposed with respect to each other and normal to the axis of a shaft, that is to receive the pneumatic clutch 6, in order for proper operation and minimal wear of the friction engaging surfaces.

Figure 1:
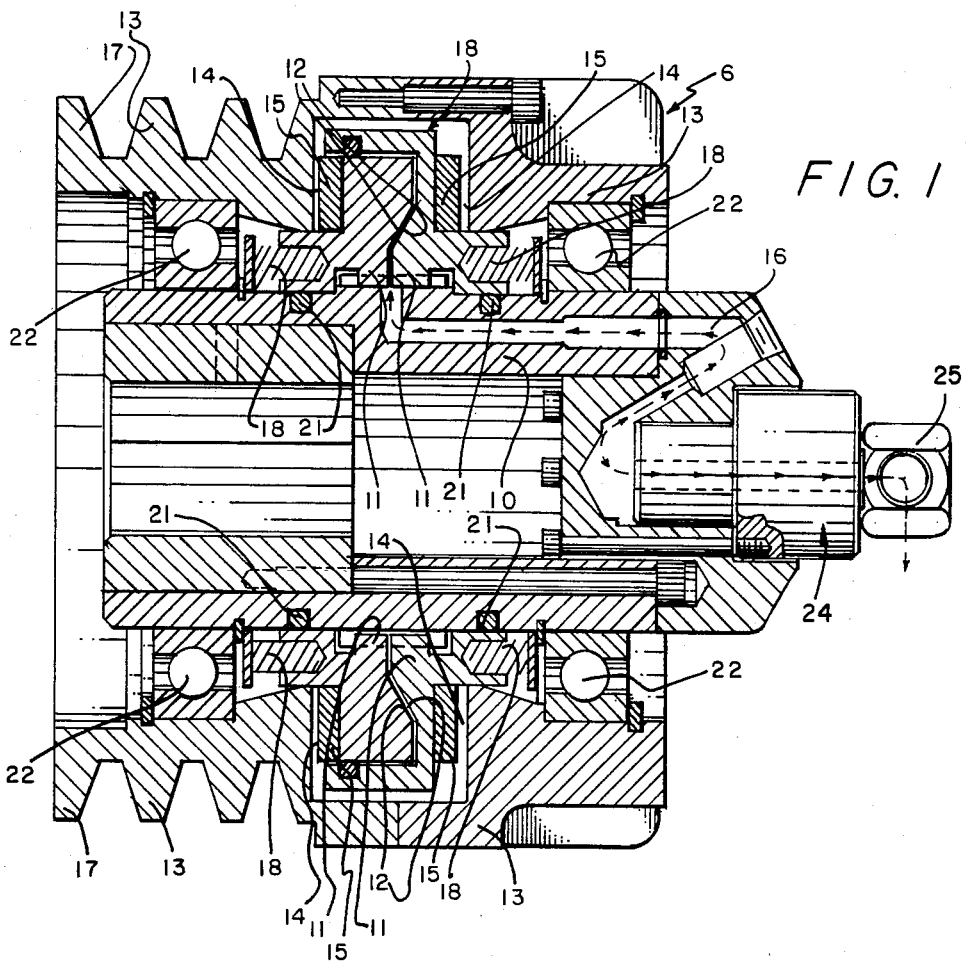
FIG. 1 is a vertical sectional view disclosing the internals of the pneumatic clutch.
Figure 4:
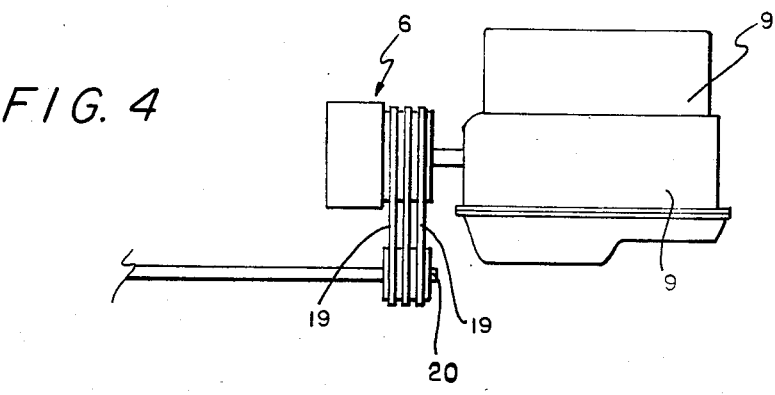
FIG. 4 is a side elevational view which discloses the clutch mounted on an input shaft of an engine, or the like, with pulleys engaged to the output shaft in order to transmit power from the output shaft to another revolving shaft.

In the preferred embodiment for the totally enclosed housing 13 of FIG. 1, totally enclosed housing 13 has a structure partially defining a V-belt sheave 17 for engagement by pulleys that interconnect the sheave 17 with a receiving shaft 20 (see FIG. 4).

Figure 6:
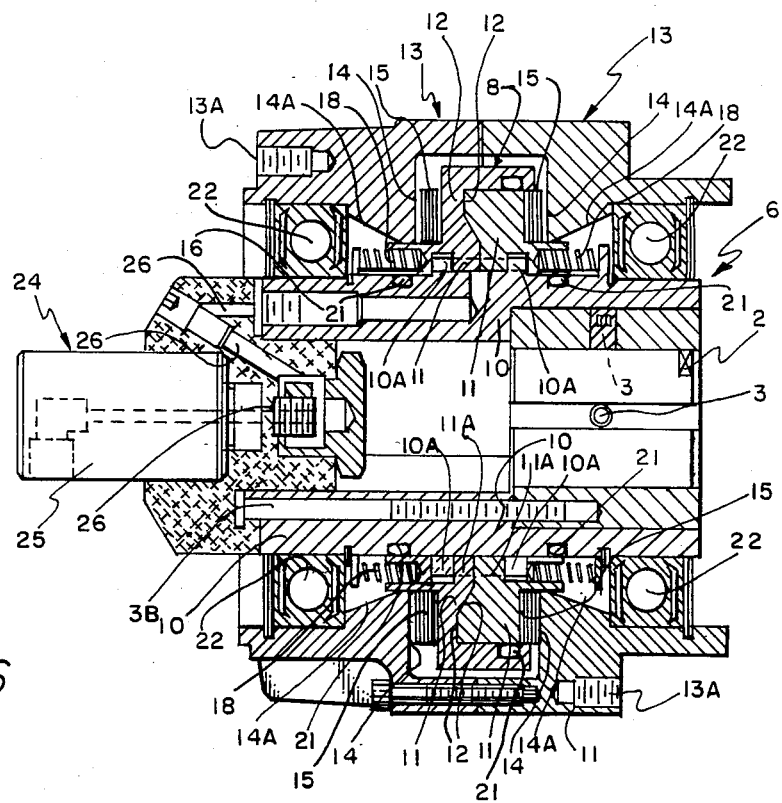
FIG. 6 is a vertical sectional view disclosing the internals of another embodiment of the pneumatic clutch.

In the preferred embodiment for the totally enclosed housing 13 of FIG. 6, totally enclosed housing 13 has a structure including at least one housing aperture 13A for threadably receiving a housing bolt 13B for mounting any member where it is desired to impart rotation to the member from the revolving totally enclosed housing 13. This is clearly illustrated in FIG. 7 where a housing bolt 13B has mounted a housing member 13C to the totally enclosed housing 13. A shaft 30 has been keyed to the housing member 13C. When the totally enclosed housing 13 commences to rotate, instantaneously and in unison, member 13C including the keyed shaft 30 start rotating. This effectively transmits rotation from a shaft, that is keyed to bushing 2, to another shaft, such as shaft 30. In a sense two shafts have been coupled.

Figure 5:
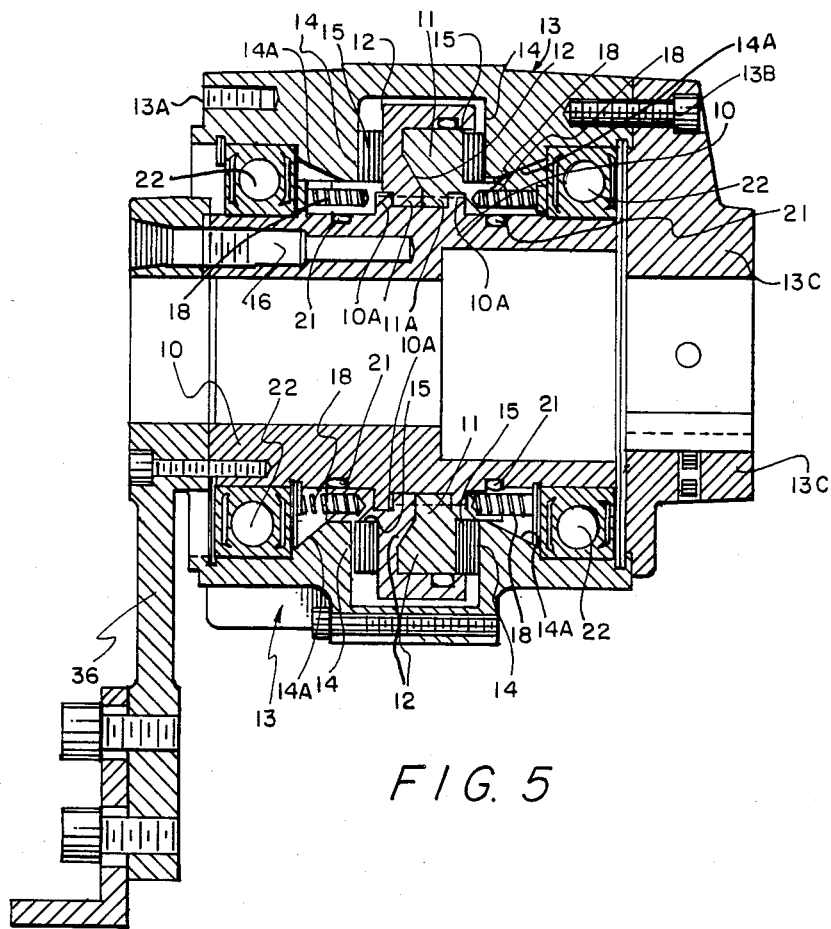
FIG. 5 is a vertical sectional view disclosing the internals of a pneumatic brake.

In a preferred embodiment of the present invention represented in FIG. 5, the features of the pneumatic clutch 6 of this invention are employed to form a brake. In FIG. 5, the totally enclosed housing 13 is revolving from the secured thereto housing member 13C being keyed to a shaft (not shown in FIG. 5), such as shaft 30 of FIG. 7, that is revolving. In order to stop or brake the revolving shaft, including the revolving totally enclosed housing 13 that is receiving its rotary power from mechanical communication with the revolving shaft through its attached housing member 13C being keyed to the revolving shaft, air under pressure is directed through the pneumatic conduit 16 to the opposed faces 12—12 of the pistons 11—11 to slidably expand the pistons 11—11 between their respective opposed faces 12—12 until the friction shoes 15 frictionally mate with the revolving driving surfaces 14—14 (which now are employed as revolving stopping surfaces) of the revolving totally enclosed housing 13. Frictional engagement of the friction shoes 15 with the revolving stopping surfaces 14—14 immediately commences to slow down and eventually stop the totally enclosed housing 13 from revolving. In unison with the totally enclosed housing 13 ceasing to revolve, any revolving shaft keyed to the housing member 13C, also ceases to revolve through the housing member 13C being secured to the totally enclosed housing 13. Brake reaction torque is achieved by an adjustable torque arm anchor 36 being bolted to the stationary clutch input shaft 10.

With continuing reference to the drawings for operation of the invention and the method of clutching in a clutch zone the totally enclosed housing 13 to a rotating power shaft, the cylindrical bushing 2 is keyed to the rotating power shaft, and the clutch input shaft 10 is secured to the cylindrical bushing 2. The pair of opposed pistons 11—11 can be rotated by the clutch input shaft 10 and are axially movable thereon. The totally enclosed housing 13 is rotatably mounted on the pair of sealed bearings 22—22 which surround the clutch input shaft 10. The clutch cavities including the pair of pistons 11—11 are now totally enclosed by supporting rotatably the totally enclosed housing 13 on the clutch shaft 10 via the sealed bearings 22—22 to prevent any matter, such as contaminants, from entering or leaving the clutch cavities simultaneously to restricting or limiting the axial movement of the pistons 11—11 and the accompanying friction shoes 15—15. The pneumatic accessory assembly 24 is connected to the clutch input shaft 10 to shorten the length of the pneumatic clutch 10, and to provide the Z-shaped pneumatic path 26 wherethrough air under pressure travels from swiveled connector 25 to and through the pneumatic conduit 16 to move axially the pistons 11—11 and the attached friction shoes 15—15.

Simultanously with the introduction of air under pressure through the swiveled connector 25, the remaining part of the pneumatic accessory assembly 24 is revolving, as well as the clutch input shaft 10, the pistons 11—11 and the cylindrical bushing 2, all from the rotary power being imparted to them by the revolving power shaft.

As air under pressure enters between the rotating opposed faces 12—12 of the rotating pistons 11—11 from the rotating pneumatic conduit 16, the rotating pistons 11—11 axially expand or move until the rotating frictional shoes 15—15 mate and seize the driving surfaces 14—14 of the totally enclosed housing 13, which transmits rotary power to the totally enclosed housing 13. In the embodiment of the pneumatic clutch 6 in FIGS. 1, 3 and 4, sheave 17 of the totally enclosed housing 13 may engage pulleys 19 for power take-off from the rotating sheave 17 to the power receiving shaft 20. The rotating pistons 11—11 including their frictional shoes 15—15 may be disengaged from the rotating driving surfaces 14—14 of the rotating totally enclosed housing 13 by the spring bias members 18 when the air under pressure is released from the pneumatic accessory assembly 24.

Figure 7:
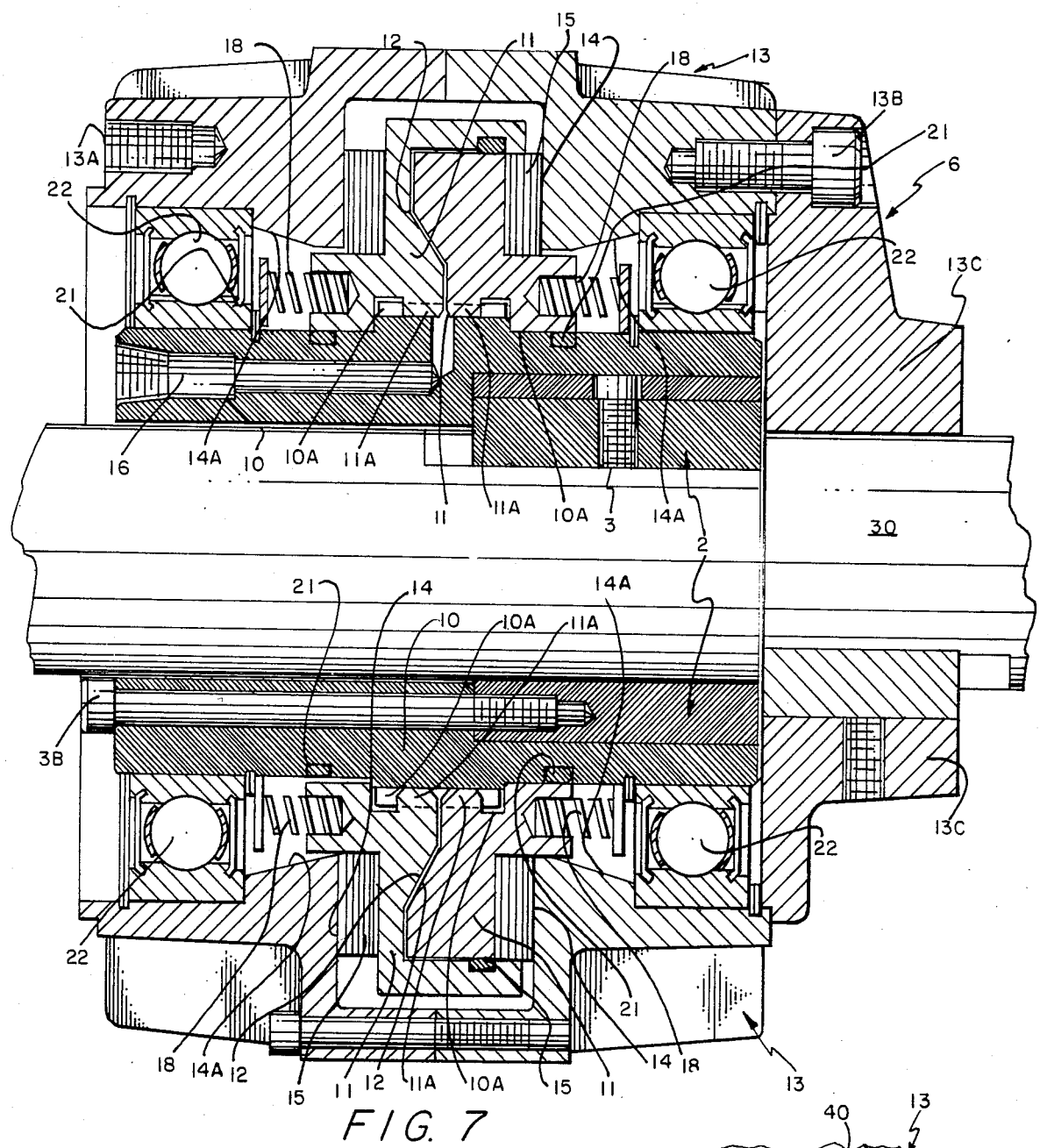
FIG. 7 is a vertical sectional view of a pneumatic coupling which utilizes the principles of this invention.

The same principles are employed in the coupling clutch embodiment of FIG. 7. Housing member 13C has been keyed to shaft 30 upon which rotational activity is desired. Bolt 13B connects the housing member 13C to the totally enclosed housing 13. When rotary power is imparted to the totally enclosed housing 13 in accordance with the previously mentioned procedure, the rotary power is instantaneously transmitted from the revolving totally enclosed housing 13 to the shaft 30 through the housing member 13C.

With respect to the operation of brake of FIG. 5, the totally enclosed housing 13 and the attached housing member 13C are revolving from a rotating shaft (such as shaft 30) that has been keyed to the housing member 13C. It is desired to stop the rotation of rotating shaft including the revolving totally enclosed housing 13 and the attached revolving housing member 13C. When the pistons 11—11 expand from air under pressure being introduced between the opposed faces 12—12 from the pneumatic conduit 16, their respective friction shoes 15—15 seize matingly the stopping surfaces 14—14 of the revolving totally enclosed housing 13. This instantaneously becomes an impediment to the totally enclosed housing 13 (including the attached housing member 13C and the keyed rotating shaft) revolving, and shortly the rotating shaft, the keyed housing member 13C, and the totally enclosed housing 13 stop revolving. Brake reaction torque is achieved by the adjustable torque arm anchor 36 being bolted to the clutch input shaft 10.

My invention will be illustrated by the following set forth examples which are given by way of illustration and not by any limitation to unduly limit the scope of my pneumatic clutch.

EXAMPLE I

The pneumatic clutch 6 of this invention mounted to a shaft. The clutches or brakes of Hanks' U.S. Pat. No. 3,762,517; Link's U.S. Pat. No. 3,750,787; and Raines' U.S. Pat. No. 4,434,883 are each mounted on a separate shaft. The pneumatic clutch 6 of this invention and the clutches or brakes of Hanks, Link, and Raines are operated for a predetermined period of time. The structural surfaces of all clutches or brakes and their surrounding environment are examined for contamination. A wash hose is taken to wash down for a predetermined period of time the entire structural surfaces of all clutches or brakes. Examine all clutches or brakes for internal damage such as slippage between frictional faces. Find that the pneumatic clutch 6 of this invention is the only clutch or brake that emitted no contaminants and prevented outside contaminants (oil, water, grease or any residues) from entering any of the clutch or brake cavities. Hanks' clutch allowed either contaminants to enter or leave at the annular gap between flange 30 and annular offset extension 39. Link's friction clutch allowed contaminants to enter or leave at radial holes 62 and 64. Raines' clutch allowed contaminants to enter or leave at the annular gap between annular piston-mount 20 and ring housing plate 35.

EXAMPLE II

Repeat Example I for the clutches or brakes of Edward's U.S. Pat. No. 3,468,402; Johnson's U.S. Pat. No. 4,335,808; and Lambert's U.S. Pat. No. 2,375,854. Find again that the pneumatic clutch 6 of this invention is the only clutch or brake that emitted no contaminants and prevented outside contaminants from entering any of the clutch or brake cavities. Edwards' clutch or brake did not prevent contaminants from entering or leaving the internal cavities because of the radial perforations or axially extending slots between the inclined walls of axially extending spokes such as that designated by the numeral 180, and because the brake lining is completely exposed from the radially extending grooves 188 in the operating face thereof to promote flow of cooling air. Johnson's clutch or brake allowed contaminants to enter or leave through the annular gap between flange 14 and reduced width portion 36. The annular gap between rotary member 5 and stator plate 15 of Lambert's heavy duty disk brake did not prevent any contaminant from entering or leaving the brake cavity.

Thus by the practice of this invention there is provided a clutch or a brake which accomplishes the specific goal of sealing the friction coupling interfaces from the working environment. The clutch or brake of this invention can perform reliably in working environments where friction reducing contamination is inherent and unavoidable, as well as in environments where spent friction lining residue is intolerable. Unsealed and open face clutches and brakes cannot operate in such environments. The friction carrying surfaces of the clutch or brake of this invention are assuredly parallely disposed with respect to each other and normal to the axis of a clutch or brake receiving shaft through the use of the perfectly cylindrical bushing. The Z-shaped pneumatic path of the pneumatic assembly shortens the length of the pneumatic clutch to make it more compact.

While the present invention has been described herein with reference to particular embodiments thereof, a latitude of modification, various changes and substitutions are intended in the foregoing disclosure, and in some instances some features of the invention will be employed without a corresponding use of other features without departing from the scope of the invention as set forth.

I claim:

1. A pneumatic clutch comprising a clutch input shaft having a structure defining a pneumatic conduit;

a pair of pistons having opposed faces and drivably connected with said clutch input shaft and axially movable along and with respect to said clutch input shaft;

a totally enclosed housing means rotatably carried and supported by said clutch input shaft;

said pair of pistons making a driving connection with said totally enclosed housing means when air is directed under pressure through said pneumatic conduit to said opposed faces for effectively moving said pair of pistons axially to seize said totally enclosed housing means while said totally enclosed housing means prevents the transfer of any matter from within any internal cavity of the pneumatic clutch to the atmosphere simultaneously with preventing any matter including outside contaminants from entering any internal cavity of the pneumatic clutch;

said totally enclosed housing means has two driving surfaces; and a structure defining a pair of internal tapering surfaces which taper from a larger diameter area to smaller diameter area;

each of said pair of pistons carries a friction shoe means operable to mate with and seize said driving surfaces of said totally enclosed housing means;

a spring bias means secured to said clutch input shaft and to each of the pair of pistons to oppose axial motion of said pistons;

a pair of sealed bearing means situated in said larger diameter area and between the clutch input shaft and the totally enclosed housing in order for the totally enclosed housing to be rotatably carried by the clutch input shaft;

said spring bias means, said pair of pistons and their respective friction shoe means, and said driving surfaces of said totally enclosed housing means are positioned between the pair of sealed bearing means, with each of said spring bias means being situated between the tapering surfaces of said totally enclosed housing and said clutch input shaft.

2. The pneumatic clutch of claim 1 additionally comprising an entirely cylindrical bushing means attached to said clutch input shaft.

3. The pneumatic clutch of claim 1 wherein said totally enclosed housing means additionally comprises a plurality of fins radially disposed on the outside thereof.

4. The pneumatic clutch of claim 1 additionally comprising a pneumatic accessory means connected to said clutch input shaft and having a structure defining a generally z-shaped pneumatic path in communication with said pneumatic conduit.

5. The pneumatic clutch of claim 1 additionally comprising a housing member means attached to said totally enclosed housing means.

6. A pneumatic clutch comprising a clutch input shaft having a structure defining a pneumatic conduit;

a pair of pistons having opposed faces and drivably connected with said clutch input shaft and axially movable along and with respect to said clutch input shaft;

a totally enclosed housing means rotatably carried and supported by said clutch input shaft;

said pair of pistons making a driving connection with said totally enclosed housing means when air is directed under pressure through said pneumatic conduit to said opposed faces for effectively moving said pair of pistons axially to seize said totally enclosed housing means while said totally enclosed housing means prevents the transfer of any matter from within any internal cavity of the pneumatic clutch to the atmosphere simultaneously with preventing any matter including outside contaminants from entering any internal cavity of the pneumatic clutch;

said totally enclosed housing means has two driving surfaces, and a structure defining a pair of internal tapering surfaces which taper from a larger diameter area to smaller diameter area;

each of said pair of pistons carries a friction shoe means operable to mate with and seize said driving surfaces of said totally enclosed housing means;

a spring bias means secured to said clutch input shaft and to each of the pair of pistons to oppose axial motion of said pistons;

a pair of sealed bearing means situated in said larger diameter area and between the clutch input shaft and the totally enclosed housing in order for the totally enclosed housing to be rotatably carried by the clutch input shaft;

said spring bias means, said pair of pistons and their respective friction shoe means, and said driving surfaces of said totally enclosed housing means are positioned between the pair of sealed bearing means, with each of said spring bias means being situated between the tapering surfaces of said totally enclosed housing and said clutch input shaft; and a pneumatic accessory means connected to said clutch input shaft and having a structure defining a generally z-shaped pneumatic path in communication with said pneumatic conduit.

7. The pneumatic clutch of claim 6 wherein said totally enclosed housing means additionally comprises a plurality of fins radially disposed on the outside thereof.

8. The pneumatic clutch of claim 6 additionally comprising a housing member means attached to said totally enclosed housing means.

9. A pneumatic clutch comprising a clutch input shaft having a structure defining a pneumatic conduit;

a pair of pistons having opposed faces and drivably connected with said clutch input shaft and axially movable along and with respect to said clutch input shaft;

a totally enclosed housing means rotatably carried and supported by said clutch input shaft;

said pair of pistons making a driving connection with said totally enclosed housing means when air is directed under pressure through said pneumatic conduit to said opposed faces for effectively moving said pair of pistons axially to seize said totally enclosed housing means while said totally enclosed housing means prevents the transfer of any matter from within any internal cavity of the pneumatic clutch to the atmosphere simultaneously with preventing any matter including outside contaminants from entering any internal cavity of the pneumatic clutch;

said totally enclosed housing means has two driving surfaces, and said totally enclosed housing means has a structure defining a pair of internal tapering surfaces which taper from a larger diameter area to smaller diameter area;

each of said pair of pistons carries a friction shoe means operable to mate with and seize said driving surfaces of said totally enclosed housing means;

a spring bias means secured to said clutch input shaft and to each of the pair of pistons to oppose axial motion of said pistons;

a pair of sealed bearing means situated in said larger diameter area and between the clutch input shaft and the totally enclosed housing in order for the totally enclosed housing to be rotatably carried by the clutch input shaft;

said spring bias means, said pair of pistons and their respective friction shoe means, and said driving surfaces of said totally enclosed housing means are positioned between the pair of sealed bearing means;

an entirely cylindrical bushing means attached to said clutch input shaft;

said totally enclosed housing means additionally comprises a plurality of fins radially disposed on the outside thereof; and a pneumatic accessory means connected to said clutch input shaft and having a structure defining a generally z-shaped pneumatic path in communication with said pneumatic conduit.

10. A pneumatic brake comprising a brake input shaft having a structure defining a pneumatic conduit;

a pair of pistons having opposed faces and drivably connected with said brake input shaft and axially movable along and with respect to said brake input shaft a totally enclosed housing means rotatably carried and supported by said brake input shaft;

a housing member means attached to said totally enclosed housing means and adapted to be keyed to a revolving first shaft in order to transmit rotary power from the revolving first shaft to the totally enclosed housing means such that said latter revolves about said brake input shaft;

said pair of pistons making a driving connection with said totally enclosed housing means when air is directed under pressure through said pneumatic conduit to said opposed faces for effectively moving said pair of pistons axially to seize said totally enclosed housing means, while said totally enclosed housing means revolving in operation prevents the transfer of any matter from within any cavity of the pneumatic brake to the atmosphere simultaneously with preventing any matter including outside contaminants from entering any internal cavity of the pneumatic brake;

said totally enclosed housing means has two stopping surfaces, and said totally enclosed housing means has a structure defining a pair of internal tapering surfaces which taper from a larger diameter area to a smaller diameter area;

each of said pair of pistons carries a friction shoe means operable to mate with and seize said stopping surfaces of said totally enclosed housing means;

a spring bias means secured to said brake input shaft and to each of the pair of pistons to oppose axial motion of said pistons;

a pair of sealed bearing means situated in said larger diameter area and between the brake input shaft and the totally enclosed housing in order for the totally enclosed housing to be rotatably carried by the brake input shaft; and said spring bias means, said pair of pistons and their respective friction shoe means, and said stopping surfaces of said totally enclosed housing means are positioned between the pair of sealed bearing means, with each of said spring bias means being situated between the tapering surfaces of said totally enclosed housing and said brake input shaft.

11. The pneumatic brake of claim 10 additionally comprising an adjustable torque arm anchor means attached to said brake input shaft.

12. The pneumatic brake of claim 11 wherein said totally enclosed housing means additionally comprises a plurality of fins radially disposed on the outside thereof.

13. A method of clutching in a clutch zone from a rotating power shaft while simultaneously preventing any matter including contaminants from entering or leaving the clutch zone, comprising the steps of:
 (a) securing a clutch shaft means having a pneumatic passageway to the power shaft;
 (b) mounting a pair of opposed piston means on the clutch shaft means in the clutch zone so that the pistons can be rotated by the clutch shaft means and axially movable thereon;
 (c) constructing a totally enclosed housing means with a structure defining a pair of internal tapering surfaces which taper from a larger diameter area to a smaller diameter area;
 (d) enclosing totally the clutch zone including the pair of opposed pistons by rotatably supporting the totally enclosed housing means on said clutch shaft means such that the totally enclosed housing means restricts or limits the axial movement of said pistons while simultaneously preventing any matter including contaminants from entering or leaving the clutch zone;
 (e) mounting a pneumatic accessory means on said clutch shaft means with said pneumatic accessory means having a structure defining a generally z-shaped pneumatic path in communication with said pneumatic passageway;
 (f) introducing air under pressure through said pneumatic z-shaped pneumatic path and into the pneumatic passageway to move the pistons axially while applying power to said power shaft to rotate the pistons until the pistons seize the totally enclosed housing means thereby transmitting rotary power from the rotating power shaft to the totally enclosed housing means while no matter including contaminants enter or leave the clutch zone.

* * * * *